US005101095A

United States Patent [19]

Wagner et al.

[11] Patent Number: 5,101,095

[45] Date of Patent: Mar. 31, 1992

[54] DIESEL ENGINE GAS FILTER WITH ELECTRICAL HEATER

[75] Inventors: Wayne M. Wagner, Apple Valley; Eugene D. Wilson, Prior Lake; Douglas E. Flemming, Rosemount; Ed Steinbrueck, Eden Prairie, all of Minn.

[73] Assignee: Donaldson Company, Inc., Minneapolis, Minn.

[21] Appl. No.: 606,878

[22] Filed: Oct. 31, 1990

Related U.S. Application Data

[62] Division of Ser. No. 331,623, Mar. 30, 1989, Pat. No. 5,053,603.

[51] Int. Cl.[5] .......................... F01N 3/08; F01N 3/02; B01D 39/20; B01D 46/42

[52] U.S. Cl. ...................................... 219/205; 55/282; 55/DIG. 30; 60/303; 123/549; 210/184

[58] Field of Search ............... 219/202, 203, 205, 207; 60/300, 303; 123/549; 55/269, 282, 283, DIG. 10, DIG. 30; 210/184, 185, 186

[56] References Cited

U.S. PATENT DOCUMENTS

| | | | |
|---|---|---|---|
| 2,091,905 | 8/1937 | Bensel et al. | 219/539 |
| 2,101,098 | 12/1937 | Russell | 219/455 |
| 2,254,880 | 9/1941 | Barnsteiner et al. | 219/465 |
| 2,731,541 | 1/1956 | Houdry et al. | 219/539 |
| 2,900,483 | 8/1959 | Welch | 392/491 |
| 3,492,457 | 1/1970 | Subt | 219/207 |
| 4,505,107 | 3/1985 | Yamaguchi et al. | 60/303 |
| 4,523,935 | 6/1985 | Takagi et al. | 55/282 |
| 4,535,589 | 8/1985 | Yoshida et al. | 60/303 |
| 4,544,388 | 10/1985 | Rao et al. | 55/282 |
| 4,548,625 | 10/1985 | Ishida et al. | 60/300 |
| 4,556,457 | 6/1986 | Nozawa et al. | 55/283 |
| 4,651,524 | 3/1987 | Brighton | 60/274 |
| 4,656,832 | 4/1987 | Yukihisa et al. | 60/303 |
| 4,671,058 | 6/1987 | Yoshida et al. | 60/303 |
| 4,723,069 | 2/1988 | Hoshizaki et al. | 219/521 |
| 4,744,216 | 5/1988 | Rao et al. | 60/303 |
| 4,878,928 | 11/1989 | Wagner et al. | 60/303 |
| 4,902,877 | 2/1990 | Grasso et al. | 219/486 |

FOREIGN PATENT DOCUMENTS

| | | | |
|---|---|---|---|
| 495606 | 8/1953 | Canada . | |
| 970421 | 7/1949 | Fed. Rep. of Germany | 219/465 |
| 3529684 | 2/1987 | Fed. Rep. of Germany | 60/303 |
| 2-10310 | 12/1983 | Japan | 60/300 |
| 59-90713 | 5/1984 | Japan | 60/303 |
| 60-22016 | 2/1985 | Japan | 60/303 |
| 125714 | 7/1985 | Japan | 60/303 |
| 137706 | 10/1952 | Sweden | 219/455 |

*Primary Examiner*—Geoffrey S. Evans
*Attorney, Agent, or Firm*—Merchant, Gould, Smith, Edell, Welter & Schmidt

[57] ABSTRACT

A filter apparatus for reducing particulates from exhaust gases from a diesel engine having a housing containing a ceramic filter unit with an array of spirally mounted resistance rods electrically connected in parallel. A ceramic foam element is located behind the array, and is used to reflect heat back to the ceramic filter. A 12 or 24 volt battery is used as the power source.

1 Claim, 4 Drawing Sheets

DIESEL ENGINE GAS FILTER WITH ELECTRICAL HEATER

This is a division of application Ser. No. 07/331,623, filed Mar. 30, 1989, now U.S. Pat. No. 5,083,603.

FIELD OF THE INVENTION

The present invention is directed to electrical resistance heaters.

BACKGROUND OF THE INVENTION

Electrical heating resistance wire and individual resistance rods formed in a spiral pattern are well known, particularly for use in electric stoves. Such heating elements are powered ordinarily by 220 alternating current voltage. Such heating elements are not useful with batteries or other direct current sources, particularly 24 volt or lower energy power sources.

A relatively recent application for electrical heating elements relates to regenerating or cleaning ceramic filter elements clogged with particulates removed from exhaust gases of diesel engines. In this regard, Governments have been increasingly regulating the exhaust emissions of vehicles, particularly diesel-powered vehicles. As a consequence, many organizations have been conducting research into diesel particulate control for trucks, buses, cars, and other vehicles. Cellular ceramic filters have become recognized as being useful in trapping exhaust particulates. As the filters become clogged, however, they must be regenerated or an unacceptable back pressure develops. It is known that one method of periodically regenerating a ceramic filter is to heat the soot-laden front face with an electric heating element. When the proper temperature isreached, particles are incinerated and a flame front travels through the soot pack from front to back. Known heating elements operate typically with alternating current voltages from 50 to 250 volts. U.S. Pat. No. 4,671,058 shows such a device. The heating element comprises electrode plates having a substantially V-shape. The problem with known resistance elements for a ceramic filter regenerating application is that they have not been practical for use with 24 volt vehicle batteries. The present invention overcomes this problem.

SUMMARY OF THE INVENTION

The heating device of the present invention comprises a flat array of a plurality of spiral-wound resistance rods which are connected electrically in parallel and form a relatively flat heating front. One end of each of the rods is grounded. The other end is attached to electrode means which can be energized. Holding structures support the electrode means and the array of rods. In this configuration, the heating device could be used in a wide variety of applications, including a recreational vehicle stove.

A particularly important embodiment of the present heating device is energized by a direct current power source not exceeding 28 volts, for example, a 12 volt or 24 volt vehicle battery system.

Another important application of the present heating device is in conjunction with filter apparatus for reducing particulates from exhaust gases of an engine. Such filter apparatus includes a housing having a chamber with an inlet and an outlet and a fluid flow path therebetween. A filtering mechanism for the particulates is mounted within the chamber along the fluid flow path and includes a ceramic filter element. There is mechanism for regenerating the ceramic filter element. The regenerating mechanism includes the spiral-wound array of resistance rods and a holder of the array with respect to the housing. The array is in close proximity to the inlet end of the ceramic filter element. A battery not exceeding 28 volts energizes the rods which are connected electrically in parallel. A blower provides air through the array to initiate combustion at the inlet end of the ceramic filter element and maintain the flame front as it burns. The apparatus also includes mechanism for controlling the regeneration system.

Thus, the present invention in its most general form could have a wide variety of uses. It is, however, particularly appropriate for use with the electrical systems of vehicles. In this regard, it is capable of supplying sufficient heat to initiate regenerative combustion of the soot gathered on the ceramic filter element of an exhaust filter apparatus and, thus, represents a breakthrough in exhaust emission technology.

The advantages of the present invention will become more clear by reference to the detailed description which follows and which refers to the drawings as briefly described hereinafter.

DETAILED DESCRIPTION OF THE PREFERRED EMBODIMENT

Figure 1:
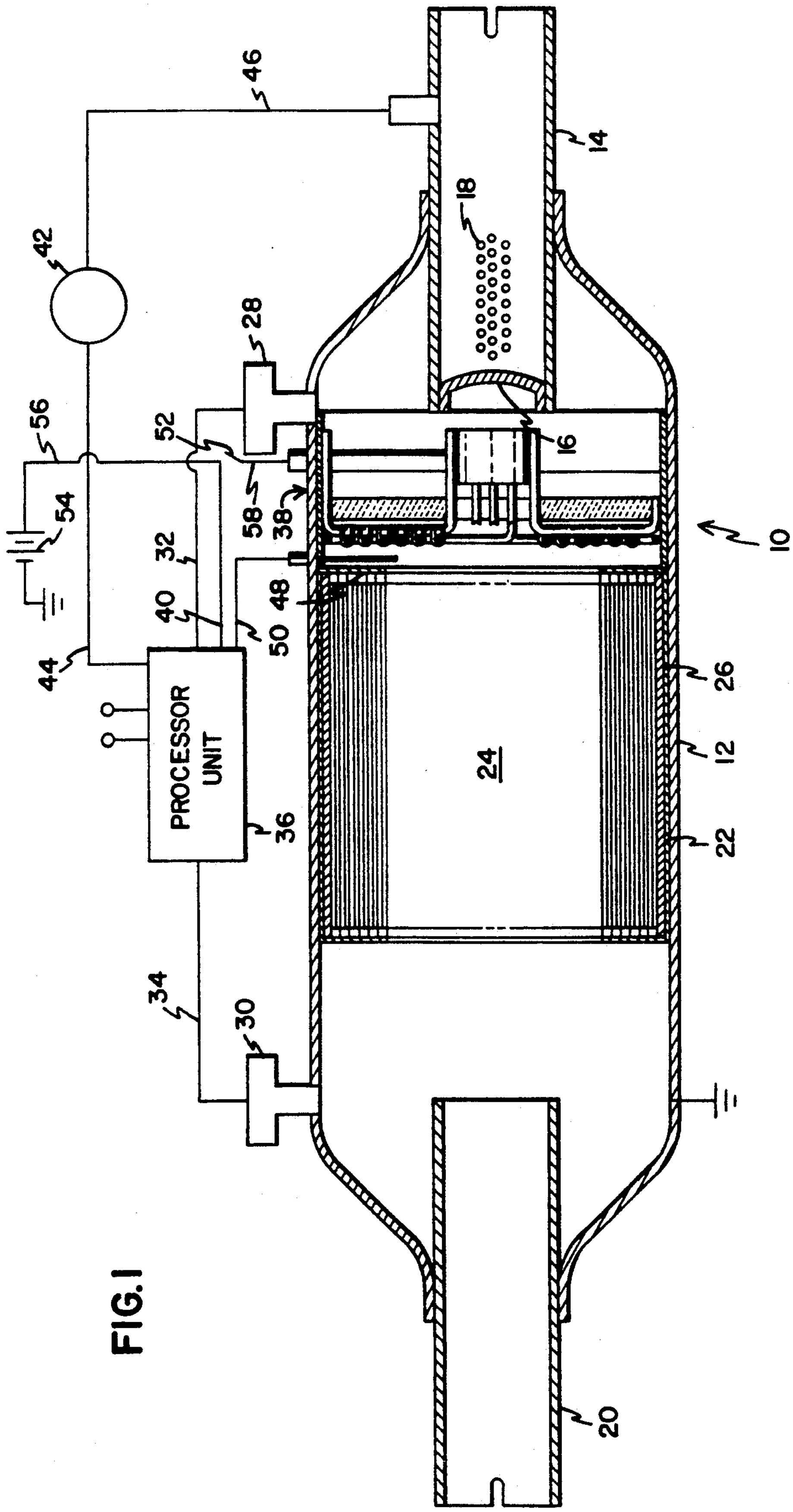
FIG. 1 is a cross-sectional view of filter apparatus for removing particulates from engine exhaust gases and which includes a heating device in accordance with the present invention.

With reference now to the drawings, where identical or corresponding parts are designated by like reference numerals throughout the several views, filter apparatus for reducing particulates from exhaust gases of an engine in accordance with the present invention is shown in FIG. 1 and designated generally by the numeral 10. Apparatus 10 includes a housing 12 which is substantially cylindrical with narrowed ends. An inlet pipe 14 is received at one end of housing 12. Inlet pipe 14 has a closed outlet end 16 and openings 18 to allow exhaust gas to expand from inlet pipe 14 into the entry portion of the chamber formed by housing 12. An outlet pipe 20 is received at the other end of housing 12. A monolithic ceramic filter is mounted in a can 22 tack welded or otherwise affixed to housing 12. Can 22 has in turned ends to retain filter 24 therein. A heat resistant mat 26 provides insulation and cushioning between filter element 24 and can 22. A ceramic filter 24 of the type useful with respect to the present invention is commercially available from Industrial Ceramics Department, Ceramics Products Division, Corning Glass Works, Corning, N.Y. 14830. In addition, a fuller discussion of the use of this type of ceramic filter with respect to a regenerative exhaust filtering system may be found in U.S. patent application Ser. No. 4,851,015, filed Aug. 21, 1987.

The back pressure to the engine or some kind of differential pressure monitoring system determines when filter 24 is loaded to a level which requires regeneration. Pressure sensors 28 and 30 illustrate such a sensing mechanism and are wired via lines 32 and 34 to a processor unit 36. At the appropriate time, processor unit 36 closes switch 52 to energize heating device 38 by providing electrical continuity with battery 54 via line 56 through switch 52 and line 58. Also, at an appropriate time, a blower 42 is turned on via line 44 to direct air therefrom through line 46 into the entry portion of the chamber enclosed by housing 12. A thermocouple 48 monitors temperature and provides temperature information via line 50 to processor unit 56.

Figure 2:
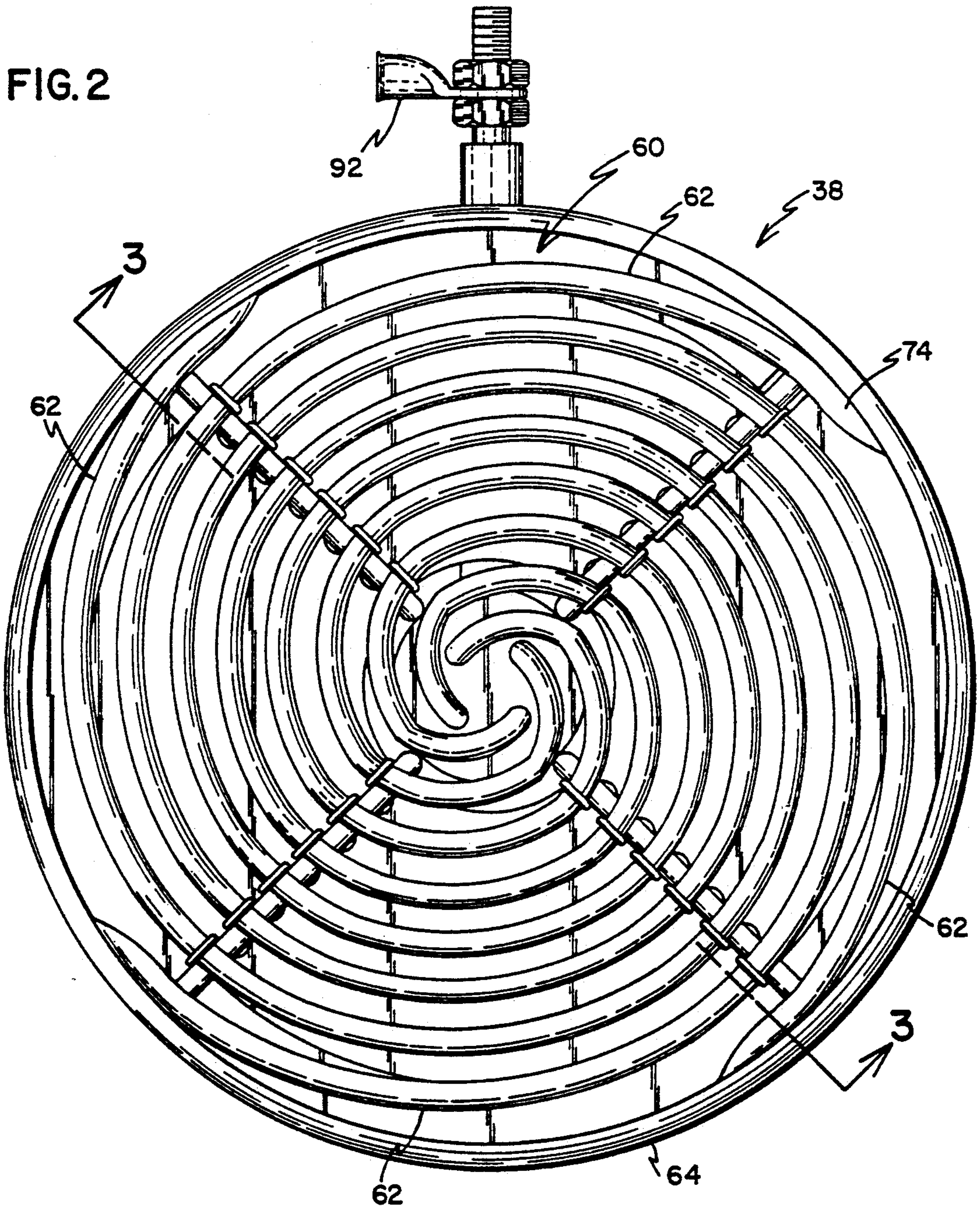
FIG. 2 is a top-view of the heating device.
Figure 3:
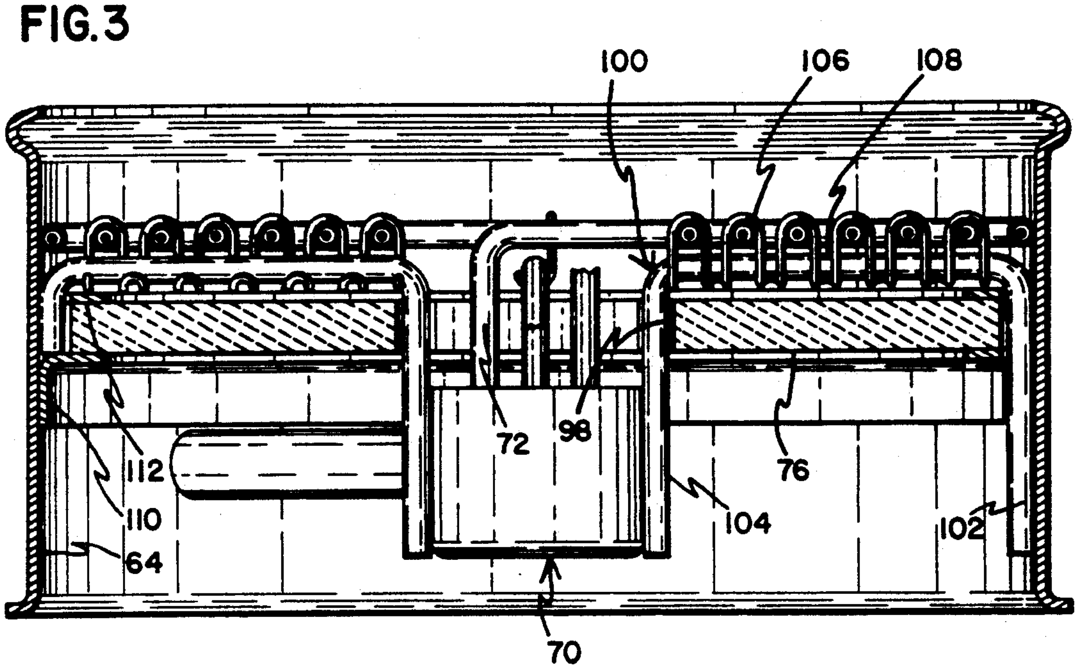
FIG. 3 is a cross-sectional view taken along line 3—3 of FIG. 2.
Figure 5:
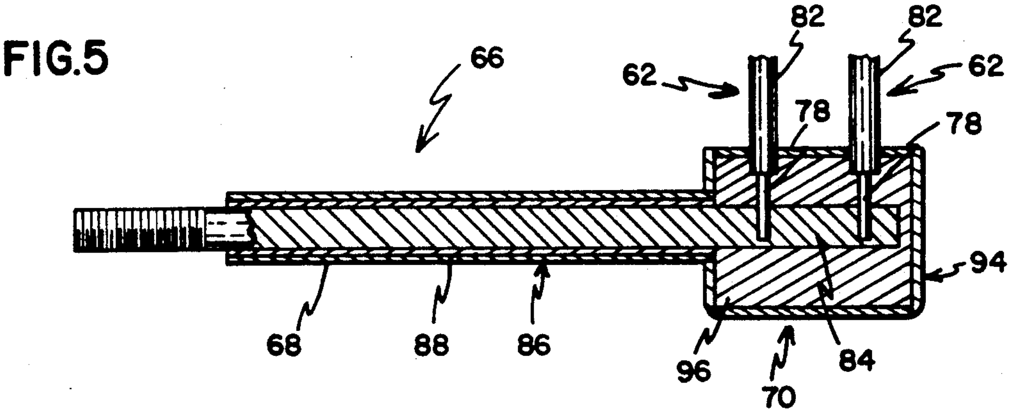
FIG. 5 is a cross-sectional view taken along line 5—5 of FIG. 4.
Figure 4:
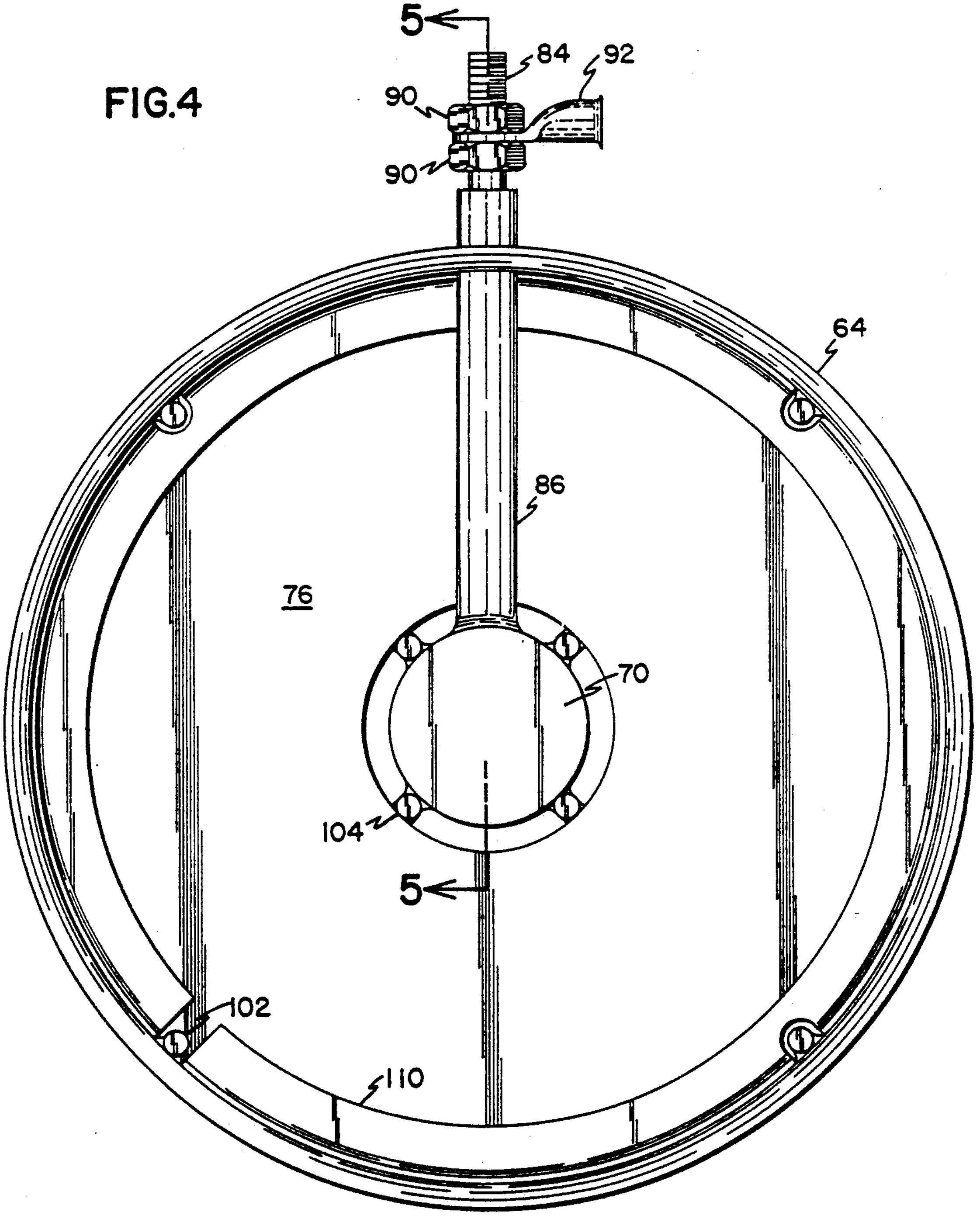
FIG. 4 is a bottom view of the heating device.

As shown in FIGS. 2–4, heating device 38 includes a flat array 60 of a plurality of spiral-wound resistance rods 62. Array 60 is supported with respect to a metallic, cylindrical wall 64. Electrically, wall 64 serves as the ground. An electrode assembly 66, as shown in FIG. 5, includes a sheath 68 which extends through and is attached to wall 64. Electrode assembly 66 also includes a receiver 70 which is centered with respect to cylindrical wall 64 and receives the first or inside ends of rods 62. A ceramic foam disc 76 is supported between array 60 and electrode assembly 66 to provide a barrier for heat radiated rearwardly and a mechanism to reradiate the heat forwardly through array 60.

Array 60 includes a plurality of spiral-wound resistance rods. The number of rods can vary, but must be more than one. It is critical to the present invention that the plurality of resistance rods be electrically connected in parallel to reduce circuit resistance thereby allowing a lower voltage energizing source. The rods 62 are formed into a spiral such that each rod has a spiral loop between consecutive loops of any other one rod. In this fashion, each rod is formed identically and simply has ends which are offset with respect to the other rods. Preferably, the density of the rods is such that the spacing between the rods is about equal to the diameter of the rods. Maximum recommended spacing is two rod diameters while minimum recommended spacing is a quarter of a diameter. As shown in FIG. 2, the ends of the various rods are offset from one another by 90 degrees, and spacing between the various rods is approximately one diameter of one of the rods.

Figure 6:
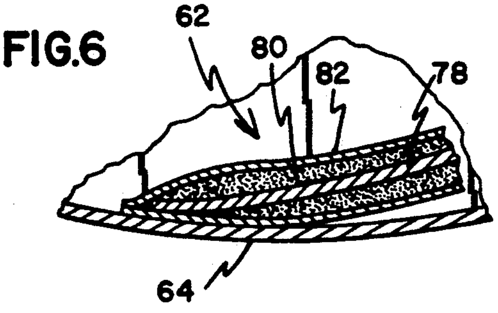
FIG. 6 is a cross-sectional view of an outside end of a resistance rod attached to the housing wall.

Each resistance rod 62, as shown in FIG. 5, includes a central resistance coiled wire 78 surrounded by insulation powder 80 which is covered by a metal sheath 82. At the first ends of rods 62, it is the resistance wire 78 which is attached usually by weld to the electrode stud 84 of the electrode assembly 66. At the second ends 74, as shown in FIG. 6, the resistance wire 78 is fastened by weld to sheath 82 which is then closed so as to enclose insulation powder 80 and which is then welded to metallic wall 64 thereby grounding sheath 82 and the second ends of rods 62.

The ends of cylindrical wall 64 are formed as appropriate and are not particularly important to the present invention. If heating device 38 is used as a part of filter apparatus 10, the ends of cylindrical wall 64 are formed to match the diameter and mating edges of housing 12 so as to be welded thereto so that cylindrical wall 64 forms a continuous part of housing 12.

Electrode assembly 66 includes a receiver 70 and an elongated portion 86 which extends from receiver 70 through cylindrical wall 64 to a location external of wall 64. Elongated portion 86 includes electrode stud 84 having one end in receiver 70 and the other end threaded and located external of wall 64. Stud 84 is surrounded by insulating material 88 which is enclosed by a sheath 68. As shown in FIG. 4, a pair of nuts 90 may be threaded onto stud 84 with a lug 92 fastened between them. Lug 92 may be part of line 58 as schematically shown in FIG. 1.

Receiver 70 is a capped metallic cylinder 94 filled with insulating material 96. Elongated portion 86 of electrode assembly 66 is positioned so that sheath 88 is fastened to cylinder 94, and stud 84 extends into cylinder 94. Electrode stud 84 is everywhere spaced from sheath 88 and cap cylinder 94 by insulating material 88 and 96 to prevent any electrical shorting. Resistance rods 62 each have a bend near the center of array 60 so that the ends 72 can be received in receiver 70. In this regard, sheaths 82 are fastened by weld to an end of cylinder 94, while resistance wires 78 are attached to electrode stud 84. The resistance wires are also everywhere separated from sheaths 82 and cylinder 94 by insulating material 80 and 96.

Ceramic foam disc 76 has a central opening 98 through which first ends 72 of rods 62 may extend. Ceramic disc 76 has a thickness of preferably one to four diameters of rods 62. An appropriate ceramic disc 76 is made of lithium alumina silicate (LAS) having a porosity of approximately 10 to 30 pores per inch. Acceptable material may be obtained commercially from Hi-Tech Ceramics Inc., P.O. Box 1105, Alfred, N.Y. 14802.

A support structure holds array 60, ceramic disc 76, and electrode assembly 66 with respect to one another and with respect to cylindrical wall 64. An appropriate support structure includes a plurality of U-shaped wire rods 100 having one leg 102 welded or otherwise fastened to wall 64 and the other leg 104 welded or otherwise fastened to receiver 70. In this way, rods 100 support receiver 70, while cylindrical wall 64 supports elongated portion 86 of electrode assembly 66. A smaller wire 106 is looped under the base 108 of each U-shaped rod 100 and over the various resistance rods 62 to fasten them solidly to each of the various U-shaped rods. In this way, the ends of the resistance rods are fastened to wall 64 and receiver 70, while the various spiral loops are held securely by wire 108.

Ceramic disc 76 is held solidly in place by a pair of cylindrical elbow brackets 110 and 112. Both are tack welded to wall 64. One elbow bracket supports the ceramic disc along its backside, while the other retains it on the front side.

In use, if heating device 38 is used essentially as a stove, then it functions as intended as soon as electrode stud 84 is energized by DC voltage. If heating device 38 is used as a regenerating heating element in filter apparatus, then the device is energized according to the logic of the processor unit. In any case, it again functions as intended as soon as voltage is applied between the electrode and ground.

In a typical circuit, like a vehicle electrical system, 12 or 24 volt direct current batteries provide or are required to provide current loads of 100 to 200 amps resulting in a total power requirement of 1 to 5 kilowatt. The present heating device has been made to include approximately 600 watt elements requiring a maximum of about 25 amps and a resistance of about 0.96 ohms per element. With four elements connected in parallel as shown in FIG. 2, the heating device requires about 2400 watts. Such output with electrical and physical configuration described herein is not available from prior art devices.

The present invention, therefore, although simple is significant with respect to providing a heating function where it has heretofore been available. Although this invention has been thus described, it must be understood that as disclosed it is representative and that equivalents are possible For this reason, changes from the present disclosure, especially in matters of shape, size, and arrangement, are within the principal of the invention to the full extent extended by the general meaning of the terms in which the appended claims are expressed.

What is claimed is:

1. Filter apparatus for reducing particulates from exhaust gases from a diesel engine, comprising:

a housing having a chamber with an inlet, an outlet, and a fluid flow path leading from said inlet upstream to said outlet downstream;

means, within said chamber along said fluid flow path, for filtering the particulates from said exhaust gases, said filtering means including a ceramic filter element having an inlet end;

means for regenerating said ceramic filter element, said regenerating means including an array of spiral-wound resistance rods and means for holding said array with respect to said housing, said array being in close proximity with the inlet end of said ceramic element, said array having a center and said electrode means including means behind said array center for receiving and supporting said first ends, said first ends including a bend to connect with said receiving means, said resistance rods including a resistance wire, insulation material, and a metallic sheath, said resistance wire being surrounded by said insulation material which is covered by said metallic sheath, the second ends of said resistance rods being formed so that said resistance wire is in contact with said sheath which is closed so as to enclose said insulation material, said second ends being electrically grounded, said regenerating means further including a battery not exceeding 28 volts and means for electrically connecting said battery and said rods so that said adjacent spiral rods are electrically in parallel with one another, said regenerating means also including means for blowing air through said array toward the inlet end of said ceramic filter to initiate and maintain regenerative combustion;

a ceramic foam supported behind said array by said holding means, said ceramic foam absorbing heat radiated toward it and reradiating the heat back toward and through said array; and means for controlling said regenerating means.

* * * * *

UNITED STATES PATENT AND TRADEMARK OFFICE
CERTIFICATE OF CORRECTION

PATENT NO. : 5,101,095

DATED : March 31, 1992

INVENTOR(S) : Wayne M. Wagner et al.

It is certified that error appears in the above-identified patent and that said Letters Patent is hereby corrected as shown below:

Column 1, line 6, "5,083,603, should be--5,053,603--.

Column 2, lines 67 and 68, delete "patent application Ser. No. 4,851,015, filed Aug. 21, 1987" and substitute therefore--Patent No. 4,851,015--.

Signed and Sealed this

Twentieth Day of July, 1993

Attest:

Michael K. Kirk

MICHAEL K. KIRK

Attesting Officer

Acting Commissioner of Patents and Trademarks